（12）United States Patent
Le-Bars et al.

(10) Patent No.: US 11,351,700 B2
(45) Date of Patent: Jun. 7, 2022

(54) SYSTEM AND METHOD FOR PRODUCING RUBBER MIXTURE FOR TIRES (71) Applicant: COMPAGNIE GENERALE DES ETABLISSEMENTS MICHELIN, Clermont-Ferrand (FR)

(72) Inventors: Lionel Le-Bars, Clermont-Ferrand (FR); Stephane Bornes, Clermont-Ferrand (FR); Stephan Otto, Clermont-Ferrand (FR); Claude Thiallier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 779 days.

(21) Appl. No.: 16/304,520

(22) PCT Filed: May 3, 2017

(86) PCT No.: PCT/EP2017/060543
§ 371 (c)(1),
(2) Date: Nov. 26, 2018

(87) PCT Pub. No.: WO2017/202584
PCT Pub. Date: Nov. 30, 2017

(65) Prior Publication Data
US 2019/0176363 A1 Jun. 13, 2019

(30) Foreign Application Priority Data
May 27, 2016 (FR) ........................ 1654801

(51) Int. Cl.
B29B 7/74 (2006.01)
B29B 7/18 (2006.01)
B29B 7/56 (2006.01)

(52) U.S. Cl.
CPC ............ *B29B 7/7495* (2013.01); *B29B 7/183* (2013.01); *B29B 7/566* (2013.01); *B29B 7/568* (2013.01); *B29B 7/7461* (2013.01); *B29B 7/7485* (2013.01)

(58) Field of Classification Search
CPC ....... B29B 7/7495; B29B 7/568; B29B 7/566; B29B 7/7461; B29B 7/7485; B29B 7/724;
(Continued)

(56) References Cited
U.S. PATENT DOCUMENTS
1,590,638 A 6/1926 Marquette
1,953,721 A 4/1934 Olson et al.
(Continued)

FOREIGN PATENT DOCUMENTS
EP 0 979 714 A1 2/2000
FR 2978370 A1 2/2013
(Continued)

OTHER PUBLICATIONS
International Search Report dated Jul. 10, 2017, in corresponding PCT/EP2017/060543 (3 pages).

Primary Examiner — Charles Cooley
(74) Attorney, Agent, or Firm — Venable LLP (57) ABSTRACT
In the field of tire production, systems and methods make it possible to selectively carry out monopassage and multipassage rubber production sequences in a common rubber production facility. A tire is formed according to the methods described.

16 Claims, 4 Drawing Sheets (58) Field of Classification Search
CPC ........... B29B 7/68; B29B 7/728; B29B 7/183;
B29B 7/82; B29B 7/726; B29B 7/748;
B29B 7/826; B29B 7/823; B29D 30/06
See application file for complete search history.

(56) References Cited

U.S. PATENT DOCUMENTS

| | | | | |
|---|---|---|---|---|
| 2,336,754 | A * | 12/1943 | Schelhammer | ....... B29B 7/7495 |
| | | | | 242/530.2 |
| 4,840,491 | A * | 6/1989 | Hagiwara | ............... B29B 7/005 |
| | | | | 366/69 |
| 5,415,823 | A * | 5/1995 | Peter | ....................... B29B 7/603 |
| | | | | 264/175 |
| 5,633,296 | A | 5/1997 | Peter | |
| 9,533,431 | B2 * | 1/2017 | Magne | ...................... B29B 7/56 |
| 10,322,527 | B2 | 6/2019 | Manabe et al. | |
| 10,328,608 | B2 * | 6/2019 | Bornes | ................... B29B 7/606 |
| 10,471,627 | B2 * | 11/2019 | Juillard | ................... B29B 7/606 |
| 10,668,679 | B2 * | 6/2020 | Prandini | ............ B29D 30/0601 |
| 2009/0238027 | A1 * | 9/2009 | Yamaguchi | ............. B29B 7/566 |
| | | | | 366/73 |
| 2014/0200307 | A1 | 7/2014 | Loubaresse et al. | |
| 2014/0360656 | A1 * | 12/2014 | Magne | .................... B29B 7/606 |
| | | | | 156/243 |
| 2018/0290336 | A1 * | 10/2018 | Bornes | .................... B29B 7/748 |
| 2018/0290338 | A1 * | 10/2018 | Juillard | ................... B29B 7/606 |
| 2019/0134852 | A1 * | 5/2019 | Le-Bars | .................. B29B 7/566 |
| 2019/0176363 | A1 * | 6/2019 | Le-Bars | ................ B29B 7/7485 |
| 2019/0210249 | A1 * | 7/2019 | Le-Bars | .................. B29B 7/566 |
| 2021/0088281 | A1 * | 3/2021 | Li | ........................... B29B 7/842 |

FOREIGN PATENT DOCUMENTS

| | | |
|---|---|---|
| FR | 2984206 A1 | 6/2013 |
| GB | 423637 | 2/1935 |
| JP | 63-168312 A | 7/1988 |
| JP | 02-286307 A | 11/1990 |
| JP | 05-305612 A | 11/1993 |
| JP | 2001-322118 A | 11/2001 |
| JP | 2002-144398 A | 5/2002 |
| JP | 2005-178257 A | 7/2005 |
| JP | 2007-216471 A | 8/2007 |
| JP | 2009-35007 A | 2/2009 |
| JP | 4802754 B2 | 10/2011 |
| JP | 4853038 B2 | 1/2012 |
| JP | 4867436 B2 | 2/2012 |
| WO | 2017/102333 A1 | 6/2017 |

\* cited by examiner

SYSTEM AND METHOD FOR PRODUCING RUBBER MIXTURE FOR TIRES

TECHNICAL FIELD

The present invention relates generally to the production of rubber mixtures and vehicle tires made therefrom. More particularly, the present invention relates to the complete production of rubber mixtures by selective execution of production sequences.

BACKGROUND

In the manufacture of tires, it is required that the tire exhibit various performance characteristics (e.g., reduced rolling resistance, better wear resistance, comparable wet and dry adhesion, estimated mileage, etc.). The tires are therefore made of various types of rubber compounds having properties critical for operation of the tire itself. To ensure that a marketable tire has the expected performance, a rubber compound can be selected from a variety of rubber mixtures, each having various ingredients mixed in different amounts and derived from a variety of production sequences. Depending on the desired characteristics, such sequences may be carried out once, twice or even several times.

Although multiple types of rubber compounds are contemplated in the tire production process, there is a choice of, and an optimized implementation of, equipment that adapts itself to the choice of, the rubber mixture production sequence. Optimal productivity is therefore possible, while retaining the availability of diverse rubber properties.

SUMMARY

The present invention is directed to a system for producing rubber mixtures having expected properties. The system includes a series of rubber mixture production installations that define monopassage and multipassage sequences of rubber mixture production. Each rubber mixture production installation permits execution of at least one rubber mixture production process.

The rubber mixture production installations include at least one initial mixing installation that performs an initial mixing process and at least two mixing and cooling installations that perform a mixing and cooling process. A first feed belt transports a rubber mixture from the initial mixing installation toward a first mixing and cooling installation. A second feed belt transports the rubber mixture from the first mixing and cooling installation toward a second mixing and cooling installation. A transport means sequentially directs the rubber mixture to at least one rubber mixing installation according to a rubber mixture recipe selected for producing a rubber mixture having expected properties.

In certain embodiments, the rubber mixture production installations include at least one complementary mixing installation that performs a complementary mixing process. This installation includes at least one ramless mixer having a chamber with a predetermined filling volume approximately two times greater than a predetermined filling volume of the internal mixer, the chamber receiving and mixing the rubber mixture with one or more complementary ingredients. In certain embodiments, the rubber mixture production installations include also at least one end-of-line installation that performs an end-of-line process.

In certain embodiments, each mixing and cooling installation includes at least one external mixer in which a pair of cylinders transforms the rubber mixture into a continuous sheet. There is at least one spray system in which one or more spray rails are positioned at each of an upper spray station and a lower spray station. Each spray rail is in communication with a source for supplying water and air to one or more nozzles at a predetermined water flow rate and a predetermined air pressure. At least one aspiration system includes one or more aspiration hoods that are positioned downstream of each respective spray rail. Each aspiration hood is in communication with a source for supplying air at a predetermined air flow rate. During the mixing and cooling process, each mixing and cooling installation sprays a respective continuous sheet. Each mixing and cooling installation evacuates the air containing the evaporated water in order to produce the rubber mixture at target values of temperature and water content before a complementary mixing process.

In certain embodiments, the rubber mixture production installations include a transport installation configured for selective transfer of a rubber mixture toward a preselected rubber mixture production installation. The transport installation includes an optional evacuation station having a spray rail and an aspiration hood. A retractable conveyance allows selective transfer to the complementary mixing installation or to the end-of-line installation.

The system produces rubber mixtures from recipes with monopassage sequences or from recipes with multipassage sequences without the need for separate equipment. Thus, the choice of expected properties is not limited by the system configuration.

The invention also relates to methods for selectively effecting one or more sequences for producing rubber mixtures according to a selected mixing recipe (e.g., a recipe requiring a monopassage sequence or a multipassage sequence). The invention also relates to a tire formed by these methods.

Other aspects of the presently disclosed invention will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Reference now will be made in detail to embodiments of the invention, one or more examples of which are illustrated in the drawings. Each example is provided by way of explanation and not by limitation of the presently disclosed invention. Selected combinations of aspects of the disclosed technology correspond to a plurality of different embodiments of the present invention. It will be apparent to those skilled in the art that various modifications and variations can be made in the present invention without departing from the scope or spirit of the invention. For instance, features or steps illustrated or described as part of one embodiment can be used with one or more other embodiments to yield at least one further embodiment. Additionally, certain features may be interchanged with similar devices or features not expressly mentioned which perform the same or similar function. Thus, it is intended that the present invention covers such modifications and variations as come within the scope of the appended claims and their equivalents.

Figure 1:
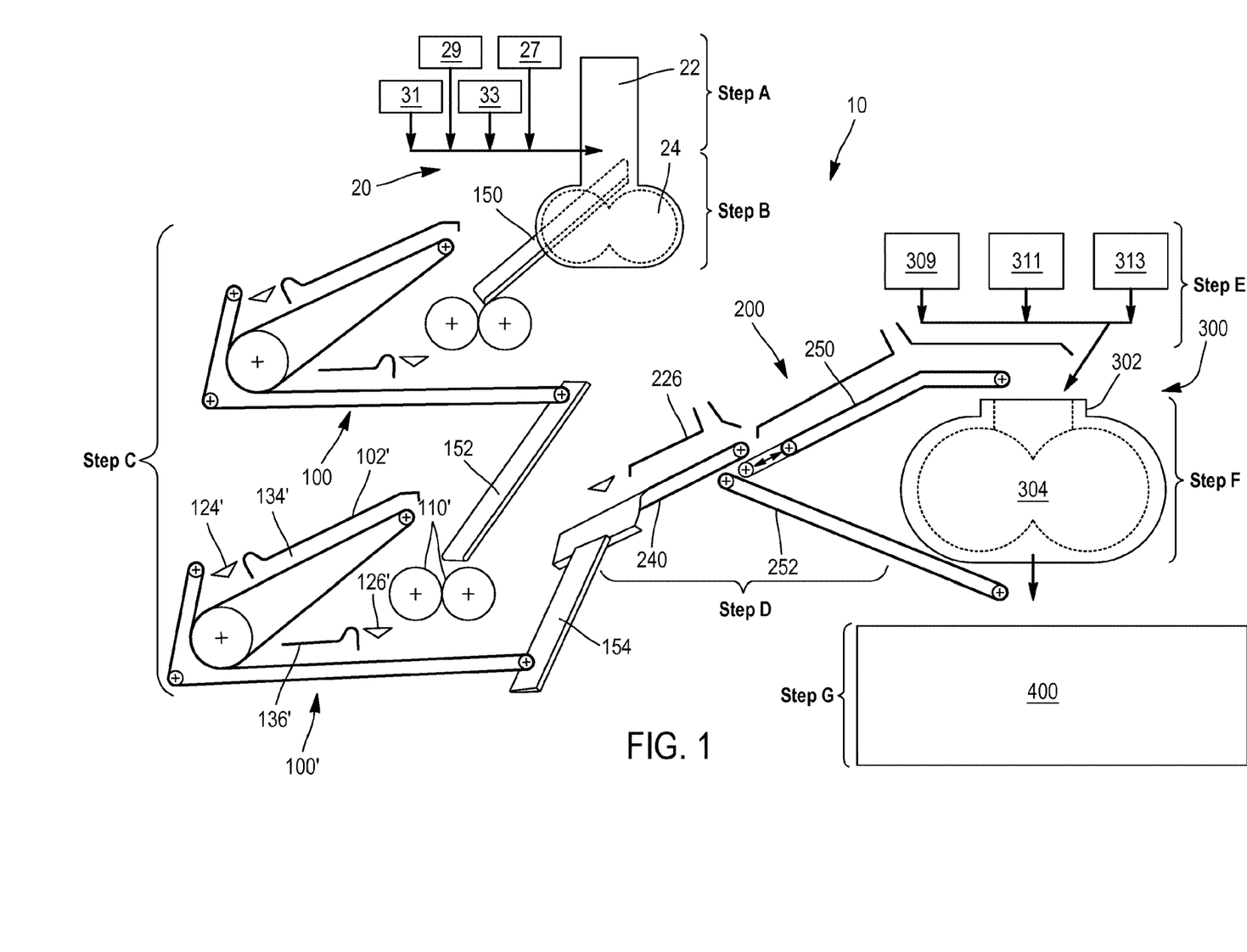
FIG. 1 shows a schematic view of an exemplary system for producing rubber mixtures according to exemplary rubber production processes of the present invention.

Now referring further to the figures, in which like numbers identify like elements, FIG. 1 shows an exemplary system 10 for producing one or more rubber products to be incorporated into one or more vehicle tires. It is contemplated that system 10 enables production of rubber mixtures having variable and customizable properties as determined by the performance properties of the resulting tire. As used herein, the term "tires" includes but is not limited to tires used with lightweight vehicles, passenger vehicles, utility vehicles (including heavy trucks), leisure vehicles (including but not limited to bicycles, motorcycles, ATVs, etc.), agricultural vehicles, military vehicles, industrial vehicles, mining vehicles and engineering machines. It is also contemplated that the products produced by the presently disclosed invention include full and partial tire treads such as those used in known retreading processes.

System 10 includes a series of rubber mixture production installations that together delineate one or more sequences of rubber mixture production. Each rubber production installation enables performance of at least one rubber mixture production process. A rubber mixture is obtained and sequentially directed to one or more of the rubber production installations according to a variety of rubber mixture recipes. System 10 allows sequential execution of rubber production processes until the resulting rubber exhibits the desired performance properties, which properties are variable and adaptable according to the rubber mixture recipe.

The rubber mixture that is selected for production in a given mixing cycle may be selectively obtained from a production sequence that is performed only once (hereinafter a "monopassage" sequence) or a production sequence that is carried out twice or more (hereinafter a "multipassage" sequence). A multipassage sequence may include one or more successive passes through at least part of the system before a final pass. The rubber mixture can thus be manufactured from a predefined recipe selected from among a plurality of rubber mixture recipes amenable to production by either by a monopassage sequence or by a multipassage sequence.

Control of the rubber mixture's properties is carried out not only by the ingredients selected for a given rubber mixture, but also by the order of their introduction as well as any intermediate steps. Since the configuration of system 10 remains static irrespective of whether it performs a multipassage or a monopassage sequence, an extensive selection of rubber mixture recipes becomes available that are suitable for the manufacture of tires. In this sense, the system allows the production of rubber mixtures from recipes with monopassage sequences or recipes with multipassage sequences without the need for separate equipment.

Still referring to FIG. 1, among the rubber production installations provided with system 10 is an initial mixing installation 20 that performs an initial mixing process. Mixing installation 20 includes at least one internal mixer 22 having a chamber 24 of a predetermined fill volume. Internal mixer 22 includes one or more mixing blades (not shown) that ensure penetration of rubber ingredients into an elastomer matrix. Internal mixer 22 may be selected from a variety of commercially available mixers.

In an initial step A of both monopassage and multipassage sequences (see FIGS. 1, 3 and 4), performed at initial mixing installation 20, internal mixer 22 receives elastomeric material 27 (e.g., natural rubber, synthetic elastomer and combinations and equivalents thereof) and one or more rubber ingredients such as one or more of implementation agents 29, protection agents 31 and reinforcing fillers 33. The rubber ingredients may include one or more of carbon black or silica in varying quantities depending upon the desired performance properties of the tire. It is understood that other rubber ingredients may be introduced into internal mixer 22 with the exception of vulcanization (e.g., cross-linking) ingredients, which are introduced later in the sequence.

In a subsequent step B of both monopassage and multipassage sequences (see FIGS. 1, 3 and 4), also performed at initial mixing installation 20, internal mixer 22 mixes the elastomeric material and the rubber ingredients to obtain a rubber mixture therefrom. The initial mixing process employs general mixing techniques as is known in the art. In some processes, mixing takes place at a temperature of not more than 180° C.

Figure 2:
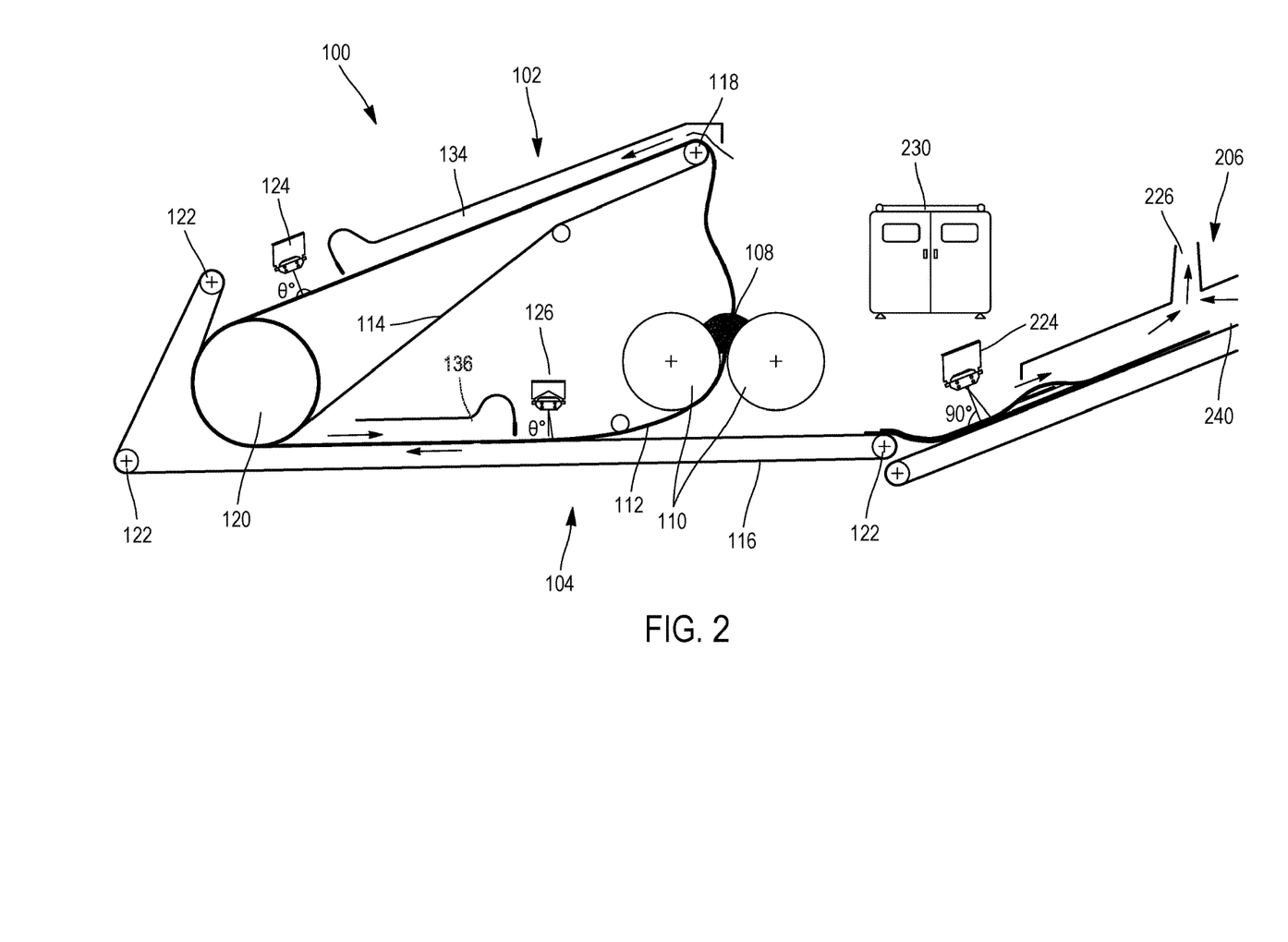
FIG. 2 shows a schematic view of an exemplary mixing and cooling installation and an exemplary evacuation station that are used within the system of FIG. 1.

Still referring to FIG. 1 and further to FIG. 2, a rubber mixture 108 obtained from initial mixing installation 20 is conveyed toward a mixing and cooling installation 100 for performance of a mixing and cooling process thereat. The mixing and cooling installation 100 is one of two mixing and cooling installations 100, 100' that include at least one external mixer. The description below refers to the installation 100 but it is understood that the two installations 100, 100' are identical. In some embodiments, the size of the installations could be different.

The installation 100 includes a pair of cylinders 110. Each cylinder 110 has a rotational axis and the cylinders are arranged in a mutually opposed manner such that the rotational axes are parallel to one another. Cylinders 110 may exhibit identical diameters and lengths to ensure uniform and repeatable performance thereof during successive mixing cycles. One or both of cylinders 110 may have fluid or commensurate cooling means integrated therein as is known in the art.

Mixing and cooling installation 100 also includes at least one upper spray station 102 and a lower spray station 104 that are both incorporated into a spray system that sprays water and an aspiration system. The spray system includes one or more respective spray rails 124, 126 positioned at each of the upper and lower spray stations. Each spray rail is in communication with a water supply source and an air supply source that supply water and air to one or more nozzles at a predefined water flow rate.

The aspiration system includes one or more respective aspiration hoods 134, 136 positioned downstream of each rail. Each aspiration hood is in communication with an air supply source for the aspiration of air. The addition of water by the rails 124, 126 supplies the ambient air with moisture. The air containing evaporated water is aspirated to prevent the introduction of water into the rubber mixture. Each combination of rail and aspiration hood serves as a checkpoint that optimizes the cooling of rubber mixtures 108 over the entire production line.

In a step C, both for monopassage and multipassage sequences (see FIGS. 1, 3 and 4) performed at mixing and cooling installation 100, cylinders 110 transform rubber mixture 108 into a continuous sheet 112 which then circulates according to a predefined path. The predefined path includes one or more continuous conveying means (for example one or more conveyor belts or transport equivalents). For the example of mixing and cooling installation 100 illustrated in FIG. 2, the predefined path is formed at least partly by a continuous belt 114 positioned at the upper spray station 102 and another continuous belt 116 positioned at the lower spray station 104. Belts 114, 116 are driven at least by an upper roller 118 and a lower roller 120 of larger relative diameter. One or more auxiliary rollers 122 can complement the belts 114, 116 as is known in the art. Although the belts 114, 116 are described as separate transport means, one continuous belt can replace them.

In some recipes, the cycle can take place as follows. After the initial mixing process is carried out at the initial mixing installation 20, the system 10 sends via a first feed belt 150 the rubber mixture 108 toward the installation 100. The rubber mixture 108 passes between the cylinders 110 of installation 100 in order to form a continuous sheet 112 having a selected thickness and width.

During step C, the rubber mixture 108 is transported by belt 114 in a direction for treatment at upper spray station 102. Belt 114 transports the first rubber mixture 108 between cylinders 110 to form continuous sheet 112. Belt 116 transports the sheet in a direction for treatment at lower spray station 104. On the basis of the unique properties of the rubber mixture 108, each spray rail 124, 126 sprays water at a predetermined flow rate and each respective aspiration hood 134, 136 aspirates the air. The addition of water by rails 124, 126 loads the ambient air with moisture and promotes the extraction of heat during mixing. The purpose of the aspiration is to limit condensation and thereby prevent the introduction of excess water into rubber mixture 108. Each ramp and aspiration hood combination therefore serves as a checkpoint that optimizes cooling and homogenization of the rubber mixture prior to commencement of a subsequent rubber production process.

Each rail 124, 126 should be configured to provide a water flow rate as determined by the mixing recipe of the selected rubber mixture. In some processes, the predefined water flow rate may be from about 70 liters/hour to about 400 liters/hour. Similarly, each aspiration hood 134, 136 should be configured to provide a predefined air flow rate as determined by the selected rubber mixture recipe. In some processes, the aspiration of air is selected at a level from about 5000 $m^3$/hr to about 30000 $m^3$/h.

The flow rates of water and aspiration of air may vary as long as the delivered flow rates confer to the rubber mixture the target values of temperature and water content before adding the crosslinking ingredients. For example, if, after an elapsed time, the rubber mixture temperature is greater than an expected target temperature, the water flow rate (for example, as delivered by rail 124 or rail 126) can be adjusted to a higher rate than would be delivered at a lower temperature. In some processes, the target temperature of the rubber mixture is about 70° C., at which temperature the predictability and reproducibility of the process are obtained. In some processes, the target water content does not exceed about 0.20% by mass of the rubber mixture.

The adjustment of the water flow rate can be performed alone or in combination with an adjustment of the air flow rate (e.g., by the aspiration hood 134 or the aspiration hood 136). As successful adjustments are made over time, such adjustments may be repeated to ensure that the water content of any rubber mixture is limited to the target value therefor. This value is ensured prior to the subsequent addition of vulcanization ingredients.

When the rubber mixture 108 is finished on the installation 100, it is then sent via a second feed belt 152 to the mixing and cooling installation 100'. The installation 100' operates in the same way as explained above for the installation 100. The rubber mixture 108 passes between the cylinders 110' of the installation 100' to again form the continuous sheet 112. One or more ramps (124', 126') that are positioned at an upper spray station (102') spray water at a predetermined flow rate. One or more aspiration hoods (134', 136') that are positioned downstream of each respective ramp (124', 126') aspirate air. The cycle time on the installation 100' may, for example, be equivalent to the cycle time on the installation 100. The cycle time on the two installations 100, 100' may, for example, be equal to the mixing time at the initial mixing installations 20. In some embodiments, the cooling of the mixture may be different by changing a length of at least one belt between the mixing and cooling installations 100, 100'.

During the cooling and homogenization of the rubber mixture by the installation 100', a second mixture can be started in the internal mixer 22. After the mixing process of the second mixture, the system 10 sends, via the first feed belt 150, another rubber mixture toward the installation 100.

When the mixture 108 is finished on the installation 100', it is then sent via a load belt 154 toward a transport installation 200.

The recipe is carried out so as to optimize the occupancy times of the two installations 100, 100'. Thus, their waiting times without mixing (waiting at the end of the cycle of the mixer 20) or with mixing (waiting to evacuate the mixture from the installation 200) are minimized.

The use of two installations 100, 100' makes it possible to double the time spent on these installations without penalizing the overall cycle time. This configuration also makes it possible to use two cylinder tools with different settings without wasting time to effect the change of settings, especially for the adjustment of cooling equipment.

This configuration also makes it easy to modify the mixing and cooling systems in order to choose between a series system and a parallel system. Such a modification could be made by modifying, for example, the means of transport without modifying the other installations of the system.

Referring again to FIG. 3, the sheet 112 is transported from the installation 100' toward a transport facility 200 that performs the selective transfer of the sheet 112 to a preselected rubber composition production installation. Transport installation 200 includes an optional evacuation station 206 having a spray system and an aspiration system for effecting an auxiliary cooling process as described above with respect to mixing and cooling installation 100. As further illustrated in FIG. 2, evacuation station 206 includes at least one spray rail 224 having nozzles which are positioned to spray sheet 112 at a predetermined water flow rate. Rail 224 includes a similar configuration to that described above with respect to rails 124, 126. At least one aspiration hood 226 is downstream of spray rail 224 and has a similar configuration to that described above with respect to aspirations hoods 134, 136. Aspiration hood 226 is positioned to aspirate air after spraying by rail 224.

When evacuation station 206 performs additional cooling of the sheet, rail 224 sprays water thereon for evacuation by aspiration hood 226. The cooling process performed at evacuation station 206 ensures that the rubber mixture exhibits a sufficient temperature and water content for sequential execution of a process in a monopassage or multipassage sequence. In other words, the sheet has properties suitable for the execution of a subsequent process, irrespective of whether the process is part of a monopassage sequence or a multipassage sequence.

In step D, for both monopassage and multipassage sequences (see FIGS. 1, 3 and 4), performed at transport installation 200, a transport means such as an evacuation belt 240 transports sheet 112 from the mixing and cooling installation 100 toward a retractable conveyance 250 or a conveyance 252, which are available at the level of transport installation 200. In some sequences, sheet 112 is maintained at transport installation 200 prior to performing a subsequent process. The sequential direction of the rubber mixture toward a preselected rubber mixture production installation depends upon the selected rubber mixture. In this manner, system 10 realizes the benefits of both monopassage and multipassage sequences while permitting a selection between the two.

The pre-selected rubber mixture production installation is selected from a complementary mixing installation 300 that performs a complementary mixing process and an end-of-line installation 400 that performs at least one end-of-line process. The complementary mixing installation 300 realizes both monopassage and multipassage sequences and includes at least one ramless mixer 302 having a chamber 304 of a predefined filling volume. In some embodiments, the mixer 302 has a fill volume approximately twice that of internal mixer 22 positioned at initial mixing installation 20. Ramless mixer 302, which includes one or more mixing blades (not shown) as is known in the art, may be selected from commercially available mixers.

End-of-line installation 400, which is used for both monopassage and multipassage sequences, includes equipment for performing an end-of-line line process. This end of line process can be selected from profiling, sampling, processing, cooling, palletizing and storage of the rubber mixture. Equipment that is installed to perform the end of line process can be combined with other end-of-line equipment as needed.

Figure 3:
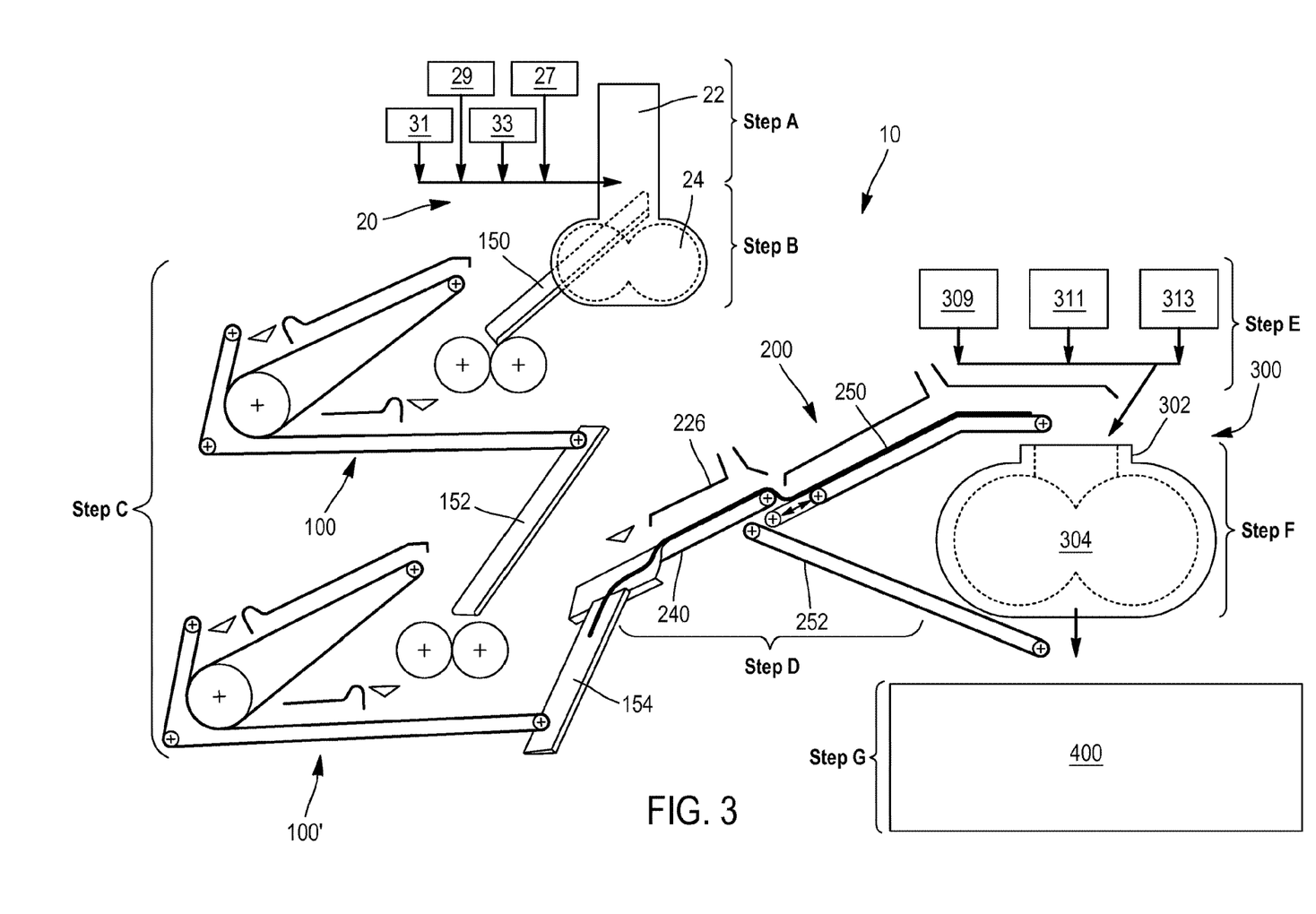
FIG. 3 shows the system of FIG. 1 during an exemplary monopassage rubber production sequence.
Figure 4:
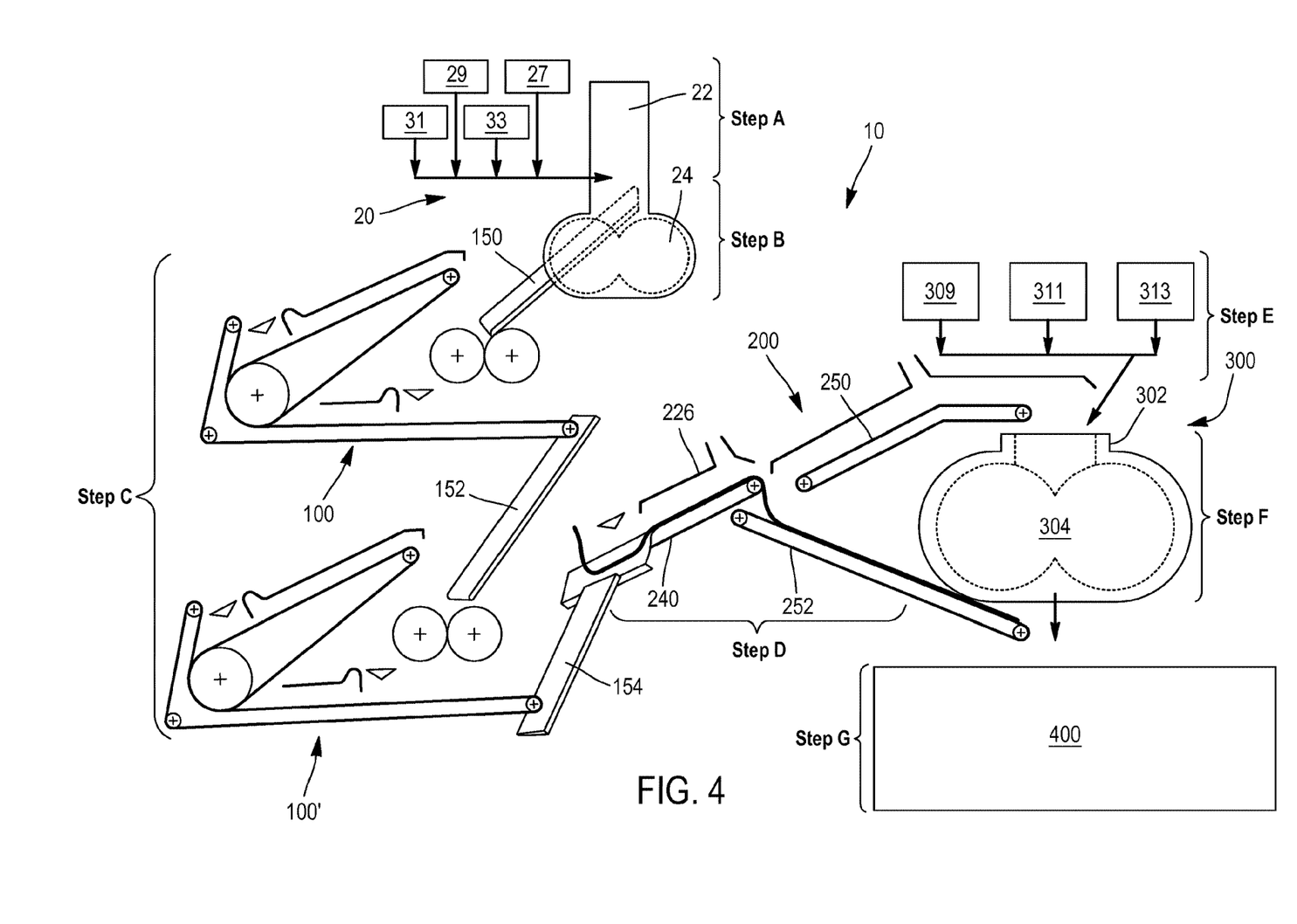
FIG. 4 shows the system of FIG. 1 during an exemplary multipassage rubber production sequence.

Referring further to FIGS. 3 and 4, retractable conveyance 250 may be positioned for selective transfer to complementary mixing installation 300 or for selective transfer to end-of-line installation 400. During step D of a monopassage sequence (see FIG. 3), retractable conveyance 250 extends toward evacuation belt 240 to allow the continuous conveyance of sheet 112 towards complementary mixing installation 300. In such sequences, retractable conveyance 250, either alone or in combination with another conveyance, dispatches the rubber mixture for performance of a complementary mixing process.

In further reference to FIG. 4, at step D of a multipassage sequence, and in particular for one or several successive passes (i.e., the passages of the sequence before the last passage), retractable conveyance 250 withdraws from evacuation belt 240 for uninterrupted conveyance of sheet 112 to end-of-line installation 400. Conveyance 252 performs the selective transfer in by-passing complementary mixing installation 300 and transporting sheet 112 directly to end-of-line installation 400. The choice between a monopassage or a multipassage sequence therefore determines whether retractable conveyance 250 is positioned to bypass the complementary mixing installation.

System 10 eliminates non-conforming mixtures in both monopassage and multipassage sequences. While the processes reduce any possibility of waste, in the case of a non-conforming material (e.g., due to a malfunction of a mixing process), the system can prevent the material from reaching complementary mixing installation 300. Consequently, additional waste of energy and time is avoided while the advantages of different rubber mixture production sequences are preserved.

Referring further to FIG. 3, during step D of a multipassage sequence and particularly during the last passage thereof, retractable conveyance 250 extends toward evacuation belt 240 for uninterrupted transport of sheet 112 towards complementary mixing installation 300. At this stage, the rubber mixture has already been transferred to end-of-line installation 400 and subject to the execution of an end-of-line process. In some multipassage sequences with successive passages before the last passage, the rubber mixture returns to the beginning of another sequence at initial mixing installation 20 (for example, starting from step B). In certain multipassage sequences having successive passes before the last pass, the rubber mixture returns to the beginning of another sequence at the initial mixing installation 20 (for example, by starting from step B of FIG. 4). In some multipassage sequences, one or more rubber mixtures are available at the end-of-line installation 400. One or more of these mixtures may be extracted and combined during a later passage (for example, by starting from step B of FIG. 4). For such sequences, evacuation station 206 performs further cooling steps to ensure that the water content and the temperature of any rubber mixture are restricted to target values prior to introduction of vulcanization ingredients during the complementary mixing process.

In a step E of both a monopassage sequence and a last pass of a multipassage sequence (see FIG. 3), performed at complementary mixing installation 300, mixer 302 receives one or more complementary ingredients (e.g., crosslinking or vulcanizing ingredients) that form the crosslinking system and any complementary elastomers and necessary additives (e.g., additional elastomers and/or recycling materials 309, protection agents 311 and crosslinking agents 313). In some processes, complementary ingredients include at least one of sulfur and one or more accelerators. It is understood that other complementary ingredients can be introduced into mixer 302.

In a step F of both a monopassage sequence and a last passage of a multipassage sequence (see FIG. 3), performed at complementary mixing installation 300, mixer 302 performs the complementary mixing process. During this process, mixer 302 mixes sheet 112 with the complementary ingredients to effect mixing of all ingredients. Upon delivery of sheet 112 to the complementary mixer, the rubber mixture has already reached the target values of temperature and water content.

During the complementary mixing process, the temperature of the rubber mixture is controlled as is known in the art (for example, by adjusting the speed of the mixing blades of mixer 302, by employing a low filling factor, etc.). In some methods, the temperature of the mixture in chamber 304 is regulated so as not to exceed 110° C. prior to delivery of the rubber to end-of-line installation 400.

In a step G of both a monopassage sequence and a multipassage sequence (see FIG. 3), performed at end-of-line installation 400, an end-of-line process can be performed as is known in the art. For monopassage sequences, step G is performed after completion of the complementary mixing process by complementary mixing installation 300. For multipassage sequences, step G is performed after the mixing and cooling process executed at installation 100' and without performing the complementary mixing process at complementary mixing installation 300 (i.e., after transfer of sheet 112 from evacuation station 206) (represented in FIG.

4). For multipassage sequences, step G is repeated after performance of the complementary mixing process at complementary mixing installation 300 (shown at step G of FIG. 4).

Thus, during multipassage sequences and before the final passage thereof, sheet 112 is transferred to end-of-line installation 400 without passing the sheet to mixer 302. This bypass of the complementary mixing installation avoids contamination of the rubber mixture by a crosslinking residue that may remain in chamber 304. Although the complementary ingredients are deliberately selected to perform efficient crosslinking, contamination with crosslinking residues is preferably avoided for recipes in which the rubber mixture requires an additional processing (e.g. at one or more of an end-of-line installation 400, a mixing and cooling installation 100 or 100' and an optional evacuation station 206).

System 10 includes a transport means that sequentially directs the rubber mixture to one or more of the rubber mixture production installations. As used herein, the term "transport means" refers to one or more transport means or conveyances such as belts 114, 116, 150, 152, 154 et 240, retractable conveyance 250, conveyance 252 and equivalent and complementary transport means. It is understood that the transport means is not limited to continuous belts and that other conveyances may be used for this purpose without departing from the scope of the present invention. The transportation can be "endless" (i.e., uninterrupted) for at least one sequence in progress and may circulate endlessly through one or more successive sequences.

The present invention contemplates the creation of rubber mixture production installations in which the rubber mixture production processes are selectively performed according to a selected rubber mixture recipe (e.g., by one or more controllers). These examples of rubber mixture production installations can follow a programmed sequence. For example, a central control center 230 (shown in FIG. 2) may be programmed with established data for a plurality of rubber mixtures, each having a unique mixing cycle profile (e.g., monopassage sequence or multipassage sequence). Additional data may include at least one predefined water flow rate to deliver for each spray rail, an air flow rate to deliver to each aspiration hood, a target temperature of the rubber mixture after an elapsed time and a target water content for the rubber mixture.

One or more sensors and/or sensor types may be optionally employed, including but not limited to environmental sensors (e.g., to sense atmospheric conditions such as temperature, pressure and/or humidity prior to initiation of a mixing cycle) and verification sensors (e.g., to sense deviation from a proscribed sequence). In this manner, the presently disclosed invention enables an increased number and variety of rubber mixtures to be produced in view of the tire to be manufactured.

While one tire may benefit from a rubber that has its properties influenced by a monopassage rubber production sequences, another tire may benefit from a rubber that has its properties influenced by a multipassage rubber production sequence. Comparable ingredients may be used for both types of sequences and are therefore amenable to manufacture on equipment that accommodates various other non-disclosed processes. Such equipment can incorporate additional beneficial rubber mixing treatment processes without compromising the quality of the resulting rubber mixture and ultimately the performance of the final product.

It is understood that one or more steps in a selected monopassage or multipassage sequence can be performed at a given time and for a predetermined duration. To support the modularity of production capacity, one or more systems can be installed in a common facility with commencement of certain steps that are staggered between the stations (for example, a cooling process of one system may begin at a pre-defined waiting time after commencement of a cooling process by another system in the same facility). The present invention also includes equilibrating one or more steps or one or more processes in the same system. The start time for one or more steps may be staggered from a start time of other steps in the same sequence. One or more steps may terminate upon the start of a subsequent step or may otherwise have their durations extended until the conclusion of a step performed consecutively.

The dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

At least some of the various techniques described herein may be implemented in connection with hardware or software or, where appropriate, with a combination of both. As used herein, the term "method" or "process" may include one or more steps performed at least by one electronic or computer-based apparatus having a processor for executing instructions that carry out the steps.

The terms "at least one" and "one or more" are used interchangeably. Ranges that are described as being "between a and b" are inclusive of the values for "a" and "b."

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A system for producing rubber mixtures having expected properties comprising:
    a series of rubber mixture production installations that define monopassage and multipassage sequences of rubber mixture production, each rubber mixture production installation permitting execution of at least one rubber mixture production process, and the rubber mixture production installations including at least one initial mixing installation that performs an initial mixing process and at least two mixing and cooling installations that perform a mixing and cooling process;
    a first feed belt that transports a rubber mixture from the initial mixing installation toward a first mixing and cooling installation;
    a second feed belt that transports the rubber mixture from the first mixing and cooling installation toward a second mixing and cooling installation; and
    transport means that sequentially directs the rubber mixture from the second mixing and cooling installation to at least one additional rubber mixing installation, including the initial mixing installation and the first mixing and cooling installation, according to a rubber mixture recipe selected for producing a rubber mixture having expected properties,
    wherein each mixing and cooling installation comprises:
        at least one external mixer in which a pair of cylinders transforms the rubber mixture into a continuous rubber mixture sheet;

at least one spray system in which one or more spray rails are positioned at each of an upper spray station and a lower spray station, each spray rail being in communication with a source for supplying water and air to one or more nozzles at a predetermined water flow rate and a predetermined air pressure; and at least one aspiration system in which one or more aspiration hoods are positioned downstream of each respective spray rail, each aspiration hood being in communication with a source for supplying air at a predetermined air flow rate, and wherein, during the mixing and cooling process, each mixing and cooling installation sprays the continuous rubber mixture sheet and evacuates the air containing the evaporated water in order to produce the continuous rubber mixture sheet at target values of temperature and water content before a complementary mixing process.

2. The system of claim 1, wherein the initial mixing installation comprises at least one internal mixer having a chamber of predetermined filling volume for receiving and mixing an elastomeric material with one or more initial ingredients during the initial mixing process.

3. The system of claim 2, wherein the rubber mixture production installations comprise:

at least one complementary mixing installation that performs a complementary mixing process and that includes at least one ramless mixer having a chamber with a predetermined filling volume approximately two times greater than a predetermined filling volume of the internal mixer, the chamber receiving and mixing the rubber mixture with one or more complementary ingredients; and at least one end-of-line installation that performs an end-of-line process.

4. The system of claim 1, wherein the initial mixing process includes producing a rubber mixture having a temperature not exceeding 180° C.;

the complementary mixing process includes producing a continuous rubber mixture sheet having a temperature not exceeding 110° C.;

a target value of the temperature of the continuous rubber mixture sheet is about 70° C.; and a target value of the water content of the continuous rubber mixture sheet does not exceed about 0.20% by weight of the continuous rubber mixture sheet.

5. The system of claim 1, wherein the rubber mixture production installations comprise a transport installation configured for selective transfer of the continuous rubber mixture sheet toward a preselected rubber mixture production installation, the transport installation comprising:

an optional evacuation station including a spray rail and an aspiration hood;

a retractable conveyance that allows selective transfer to the complementary mixing installation or to the end-of-line installation; and a conveyance that performs the selective transfer to the end-of-line installation.

6. The system of claim 5, wherein the retractable conveyance is positioned for performing a complementary mixing process from which the continuous rubber mixture sheet will be transferred to the end-of-line installation; or the retractable conveyance is positioned for transfer to the end-of-line installation without performing the complementary mixing process.

7. The system of claim 5, wherein the end-of-line installation comprises one or more of profiling, sampling, processing, cooling and palletizing equipment for performing an end-of-line process.

8. The system of claim 5 further comprising:

a load belt that transports the continuous rubber mixture sheet toward the transport installation when the continuous rubber mixture sheet is terminated on the second mixing and cooling installation.

9. The system according to claim 1, wherein the system produces rubber mixtures from recipes with monopassage sequences or from recipes with multipassage.

10. A method for selectively producing a rubber mixture from one or more sequences according to a selected rubber mixing recipe, the process comprising:

providing a system comprising:

a series of rubber mixture production installations that define monopassage and multipassage sequences of rubber mixture production, each rubber mixture production installation permitting execution of at least one rubber mixture production process, and the rubber mixture production installations including at least one initial mixing installation that performs an initial mixing process and at least two mixing and cooling installations that perform a mixing and cooling process;

a first feed belt that transports a rubber mixture from the initial mixing installation toward a first mixing and cooling installation;

a second feed belt that transports the rubber mixture from the first mixing and cooling installation toward a second mixing and cooling installation; and transport means that sequentially directs the rubber mixture from the second mixing and cooling installation to at least one additional rubber mixing installation, including the initial mixing installation and the first mixing and cooling installation, according to a rubber mixture recipe selected for producing a rubber mixture having expected properties;

sequentially directing a rubber mixture to at least one rubber mixture production installation in accordance with a selected rubber mixture recipe;

selectively transferring the rubber mixture to a preselected rubber mixture installation;

performing an initial mixing process at an initial mixing installation;

performing a mixing and cooling process at the mixing and cooling installations;

performing a complementary mixing process at a complementary mixing installation;

performing an end-of-line process at an end-of-line installation; and during the cooling process:

transforming a rubber mixture into a continuous rubber mixture sheet;

spraying water onto the continuous rubber mixture sheet at a predetermined water flow rate; and evacuating the sprayed water with an air intake source, wherein the continuous rubber mixture sheet reaches target values of temperature and water content before the complementary mixing process.

11. The method according to claim 10, further comprising:

during the initial mixing process, producing a rubber mixture having a temperature not exceeding 180° C.; and during the complementary mixing process, producing a rubber mixture having a temperature not exceeding 110° C.

12. The method according to claim 10, wherein the end-of-line process is selected from profiling, sampling, processing, cooling, palletizing and storing the rubber mixture.

13. The method according to claim 10, wherein a target value of the temperature of the continuous rubber mixture sheet is about 70° C.; and
a target value of the water content of the continuous rubber mixture sheet does not exceed about 0.20% by weight of the continuous rubber mixture sheet.

14. The method according to claim 10, further comprising:
positioning a retractable transport means for performing a complementary mixing process from which the rubber mixture will be transferred to the end of line installation; or
positioning the retractable transport means for transfer to the end-of-line installation without carrying out the complementary mixing process.

15. The method according to claim 10, further comprising:
selecting a rubber mixture from a variety of rubber mixtures derived from rubber mixture recipes for one or several sequences of rubber production,
wherein the system produces rubber mixtures from recipes with monopassage sequences or from recipes with multipassage sequences.

16. The method according to claim 10, wherein the method is carried out in an iterative manner until the rubber mixture includes properties corresponding to a selected rubber mixture recipe.

* * * * *